US008444747B2

(12) United States Patent
Kristensson et al.

(10) Patent No.: US 8,444,747 B2
(45) Date of Patent: May 21, 2013

(54) METHODS AND DEVICES FOR DISPLACING BODY CONVECTION AND PROVIDING A CONTROLLED PERSONAL BREATHING ZONE

(75) Inventors: Dan Allan Robert Kristensson, Ängelholm (SE); Pål Martin Svensson, Halmstad (SE); Niklas Sondén, Ängelholm (SE)

(73) Assignee: Airsonett AB, Angelholm (SE)

( * ) Notice: Subject to any disclaimer, the term of this patent is extended or adjusted under 35 U.S.C. 154(b) by 30 days.

(21) Appl. No.: 13/378,544

(22) PCT Filed: Oct. 7, 2010

(86) PCT No.: PCT/IB2010/002548
§ 371 (c)(1), (2), (4) Date: Dec. 15, 2011

(87) PCT Pub. No.: WO2011/042801
PCT Pub. Date: Apr. 14, 2011

(65) Prior Publication Data

US 2012/0085231 A1 Apr. 12, 2012

Related U.S. Application Data

(60) Provisional application No. 61/249,500, filed on Oct. 7, 2009, provisional application No. 61/289,099, filed on Dec. 22, 2009, provisional application No. 61/302,364, filed on Feb. 8, 2010.

(30) Foreign Application Priority Data

Dec. 22, 2009 (EP) .................................... 09015849
Feb. 8, 2010 (EP) .................................... 10001260

(51) Int. Cl.
*B01D 46/00* (2006.01)

(52) U.S. Cl.
USPC ......... 95/14; 95/17; 95/18; 96/420; 55/385.2; 128/202.13

(58) Field of Classification Search
USPC ............. 55/385.1, 385.2, 471, 486, 467, 320, 55/505, 510, 470, 472, 481, 493, DIG. 29; 95/273, 287; 128/202.13; 454/49, 56, 66, 454/152, 158, 296, 297, 298, 187
See application file for complete search history.

(56) References Cited

U.S. PATENT DOCUMENTS 3,462,920 A 8/1969 Denny
3,724,172 A * 4/1973 Wood .............................. 95/287

(Continued)

FOREIGN PATENT DOCUMENTS

WO WO 2008/058538 5/2008

OTHER PUBLICATIONS

International Search Report for PCT/IB2010/002548.

(Continued)

*Primary Examiner* — Duane Smith
*Assistant Examiner* — Minh-Chau Pham
(74) *Attorney, Agent, or Firm* — Stites & Harbison PLLC; Marvin Petry

(57) ABSTRACT

Methods and devices are provided whereby a controlled personal breathing zone is maintained using temperature controlled laminar air flow (TLA) of filtered air. A substantially laminar, descending flow of filtered air is maintained with a velocity determined by the air-temperature difference between the supplied air and the ambient air t at the level of the personal breathing zone. The air-temperature of the filtered supply air can be carefully adjusted to maintain the velocity-determining difference in air-temperature within the optimum range of 0.3 to 1° C. Thus being able to at the same time displace body convection and achieve comfort.

13 Claims, 8 Drawing Sheets

U.S. PATENT DOCUMENTS

| | | | | |
|---|---|---|---|---|
| 3,820,536 | A * | 6/1974 | Anspach, Jr. et al. | 128/202.13 |
| 3,935,803 | A | 2/1976 | Bush | |
| 4,890,544 | A * | 1/1990 | Aalto et al. | 454/49 |
| 5,129,928 | A | 7/1992 | Chan et al. | |
| 5,167,577 | A * | 12/1992 | Kristensson | 454/298 |
| 6,702,662 | B2 | 3/2004 | Kristensson | |
| 6,910,961 | B2 | 6/2005 | Niu | |
| 6,916,238 | B2 | 7/2005 | Korman | |
| 7,037,188 | B2 | 5/2006 | Schmid et al. | |
| 7,195,660 | B2 * | 3/2007 | Little et al. | 55/385.1 |
| 7,753,977 | B2 | 7/2010 | Lyons et al. | |
| 8,066,802 | B2 * | 11/2011 | Kristensson et al. | 95/273 |
| 2003/0033790 | A1 * | 2/2003 | Hague | 55/385.1 |
| 2003/0150328 | A1 * | 8/2003 | Hansson et al. | 95/273 |
| 2006/0252364 | A1 | 11/2006 | Kristenson et al. | |
| 2008/0020695 | A1 * | 1/2008 | Chang | 454/56 |
| 2008/0307970 | A1 | 12/2008 | Augustine et al. | |
| 2008/0308106 | A1 | 12/2008 | Augustine et al. | |
| 2011/0005178 | A1 | 1/2011 | Lyons et al. | |

OTHER PUBLICATIONS

International Preliminary Report on Patentability for PCT/IB2010/002548.

* cited by examiner

METHODS AND DEVICES FOR DISPLACING BODY CONVECTION AND PROVIDING A CONTROLLED PERSONAL BREATHING ZONE

CROSS REFERENCE TO RELATED APPLICATIONS

This application claims benefit of U.S. Provisional Application No. 61/249,500 filed Oct. 7, 2009, U.S. Provisional Application No. 61/289,099, filed Dec. 22, 2009 and U.S. Provisional Application No. 61/302,364. filed Feb. 8, 2010 (which are hereby incorporated by reference).

FIELD OF THE INVENTION

It has been found that the relative particle and allergen concentration in the inhaled air during situations of or corresponding to nocturnal sleep is generally higher than in other situations and elsewhere in a normal bed- or living-rooms due to body convection. Human body generated convection currents passing close by the breathing zone enforce and condense emissions from the all important reservoirs in the beddings distorted due to movements in the bed.

This invention relates in general to methods and devices for displacing body convection and reducing exposure to airborne contaminants within a personal breathing zone during situations of or corresponding to nocturnal sleep and in particular to methods and devices that utilize Temperature controlled Laminar Airflow (abbreviated TLA from herein and onwards).

BACKGROUND

Devices that reduce exposure to residential airborne contaminants, such as allergens and pollutants, are useful in residential and institutional settings. Clean air technology is highly effective at removing airborne particles by passing an ambient air stream through High Efficiency Particulate Air (HEPA) filters. However, the efficiency of HEPA filtration systems depends on airflow dynamics of the environment in which the device is used. In-mixing of contaminated ambient air with filtered air typically diminishes the ultimate efficiency of HEPA filtration.

Room air cleaner units thus cannot typically displace body convection and provide a controlled personal breathing zone.

Several devices have been reported that provide a purified personal breathing zone.

WO2008/058538, U.S. Pat. No. 6,910,961, and US2008/0308106 describe specialized air supply outlets that can be positioned to provide conditioned air for a personal clean-air environment.

US2008/0307970 describes a neck-worn device.

U.S. Pat. No. 6,916,238 describes an enclosed clean air canopy that provides a purified personal breathing zone during sleeping hours.

U.S. Pat. No. 7,037,188 describes a bed ventilation system that provides a purified personal breathing zone during sleeping hours.

All of these devices utilize impulse or forced-blown to induce and maintain a stream of filtered air, enveloping a point of care. These methods and devices are however associated with uncomfortable air flow drafts, dehydration and an overall poor control of the filtered air stream velocity. Further, even where the filtered air stream is substantially laminar, the sometimes high velocities of forced-blown air inevitably invoke turbulent in-mixing of contaminated ambient air, in the absence of a canopy or enclosure.

Turbulent in-mixing of ambient air can be avoided by utilizing gravity to induce a laminar air flow, rather than impulse or blowing force. The principle of TLA is that a laminar flow is induced by an air-temperature difference between supply air and ambient air at the point of care. A substantially laminar flow of filtered, colder air, having a higher density than ambient air descends slowly, enveloping the breathing zone of a sleeping person. The TLA principle provides an unprecedented ability to control the air flow velocity as measured at the point of care. Parts of or the whole temperature control device may be situated before or after the blower device supplying the laminar air flow. Temperature controlled laminar air flow (TLA) is based upon boundary control and unidirectional orientation of a laminar air supply structure. Stable flow conditions are maintained by introducing a temperature gradient (negative buoyancy) between the cooled supply air and ambient air in the human breathing zone. Entrainment including turbulent diffusion of ambient air into the laminar supply stream is here limited to a minimum. The filtrated and cooled laminar air, with higher density than ambient air, descends slowly enveloping the breathing zone of a person in bed. Because the air flow is substantially laminar, and entrainment of ambient air is avoided, the air-temperature difference is maintained throughout the path of descent. This downward directed displacement flow will unaffected pass physical obstacles in the air-flow path. A free and isothermal jet flow loses momentum after bouncing off physical obstacles. In contrast, the cooled TLA air retains its lower temperature despite interactions with physical obstacles. TLA thus provides improved removal of contaminants from the breathing zone to the floor level.

To be effective in providing a controlled personal breathing zone, a TLA device will ideally provide a substantially laminar descending air flow having sufficient velocity to displace convection currents caused by body heat. A warm human body causes a convection air flow having an ascending velocity of over 0.1 m/s and having an air-temperature increased as much as 2° C. above ambient air at body level. An effective TLA device thus typically provide a descending, substantially laminar flow of filtered air with velocity >0.10 m/s, and in any case, sufficient to break body convection currents.

Excess velocity of filtered air is, however, undesirable. Excess air flow velocity gives rise to drafts, which are both uncomfortable and, also, dehydrating. Avoiding drafts and dehydration is pivotal for the long term compliance by patients/users. Bare parts of the human body are extremely sensitive for air movements during low activity or sleep. Furthermore, the greater the velocity of the descending laminar air stream, the more difficult it is to control and direct it to the point of care without in-mixing of ambient air.

In a TLA device, the velocity of the descending air stream is determined by the air-temperature difference (i.e. density differences) between the colder, filtered supply air and the ambient air at the level of the point of care. Only minimal impulse is imparted to the air stream, sufficient to overcome resistance at the outlet nozzle.

U.S. Pat. No. 6,702,662 describes a device that utilizes TLA to provide a personal breathing zone. In this device, filtered air is divided into two partial air streams one of which is cooled, the other heated. The cooled air descends to a breathing zone from a laminar flow air supply nozzle. The heated partial air stream provides a controlled thermal stratification of the room, ensuring that the cooled air stream will descend free of interference from the uprising heated air stream. This device provides filtered air simultaneously to a personal breathing zone and to an entire room.

The requirement for two filtered air streams gives rise to several disadvantages. First, the device is physically more bulky than a device having only a single filtered air stream. Second, a greater volume of air flow is required for two air streams, which is associated with an increased requirement for fan or blower activity. Noise generated by a fan or blower is undesirable in a personal breathing device suited for use with sleeping patients. Third, use of this device can give rise to unwanted drafts. Because the cool partial air stream can only be cooled, the device is unable to accommodate circumstances which can arise in home use where a pre-existing air-temperature gradient exists within a room. In some circumstances, air taken in at floor level can already be significantly cooler than air at the level of the personal breathing zone. In the absence of some capacity for heating the supply air stream, an excessive descending velocity of filtered air can result, causing drafts.

In clinical trials using one embodiment of the TLA device described in U.S. Pat. No. 6,702,662, we discovered that a relatively narrow range of conditions exists in which it is possible to avoid drafts (caused by excessive velocity of the descending air stream) while also avoiding inability to displace warm body convection currents (caused by insufficient velocity of the clean air stream). We have determined that an optimum air-temperature difference between the filtered, descending laminar air and the ambient air at the level of the personal breathing zone falls within a range of about 0.3 to 1.0° C.

This optimum range can be provided by methods and devices of the present invention, which do not require two partial streams of filtered air. Only a single filtered air stream is subject to temperature adjustment. In preferred embodiments, air-temperature of the filtered air can be carefully adjusted via a temperature control system to maintain, within the optimum range, an air-temperature difference between supply air and ambient air at the level of a personal breathing zone. Reversible polarity of the thermoelectric cooler (TEC) used to provide air-temperature adjustment permits the supply air stream to be alternately cooled or heated, thereby providing necessary fine tuned control of descending air stream velocity.

By avoiding a heated secondary air flow, a TLA device can be provided that is smaller in size and thus better suited for comfortable home use. Comfort for sleeping users can also be increased by reduced fan noise.

SUMMARY

Methods and devices are provided whereby a controlled personal breathing zone is maintained using temperature controlled laminar air flow (TLA) of HEPA filtered air. A substantially laminar, descending flow of filtered air is maintained with a velocity determined by the air-temperature difference between the supplied air and the ambient air at the level of the personal breathing zone. In preferred embodiments, air-temperature of the filtered supply air can be carefully adjusted to maintain the velocity-determining difference in air-temperature within the optimum range of 0.3 to 1° C. Temperature control is facilitated by a thermoelectric cooler (TEC) using the Peltier effect with reversible polarity, whereby the supply air can be alternately cooled or heated. Thus being able to at the same time displace body convection and achieve comfort (user compliance).

DETAILED DESCRIPTION OF PREFERRED EMBODIMENTS

In some embodiments, the invention provides methods for displacing body convection and providing a controlled personal breathing zone comprising

- Taking air from a premises into an air treatment device
- Adjusting the air-temperature and purifying a flow of air in said device by adjusting the temperature either before or after filtration using one or more HEPA filters
- Discharging the purified air stream through an air supply device, situated above or adjacent to the (point of care) personal breathing zone, as a substantially laminar descending air flow with velocity determined by the difference in air-temperature between the supplied air and the ambient air as measured at the level of the personal breathing zone wherein said difference in air-temperature is maintained within a range of about 0.3 to 1° C.

In preferred embodiments of methods of the invention, it is not necessary to provide two partial air streams of purified air, one of which is cooled, the other heated.

Figure 1:
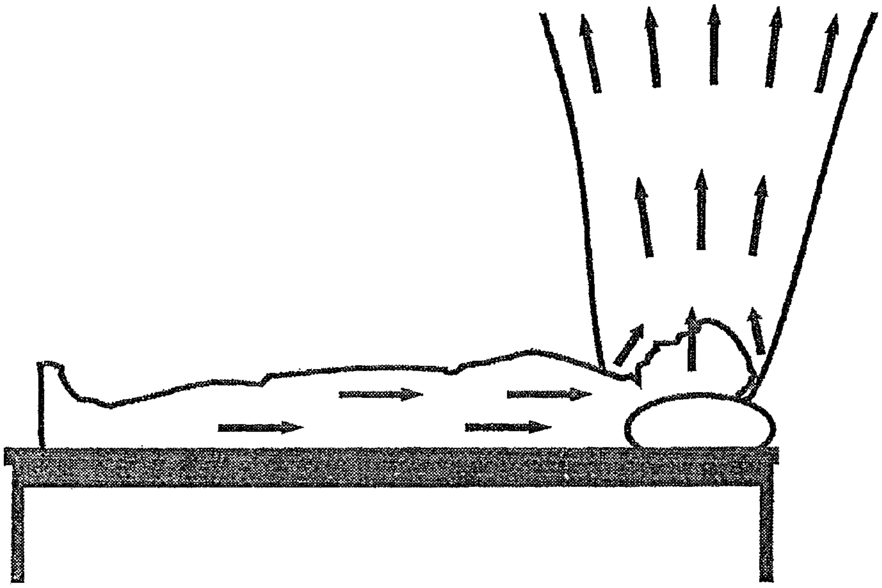
FIG. 1 illustrates convection currents generated by a warm body in a sleeping position.
Figure 2:
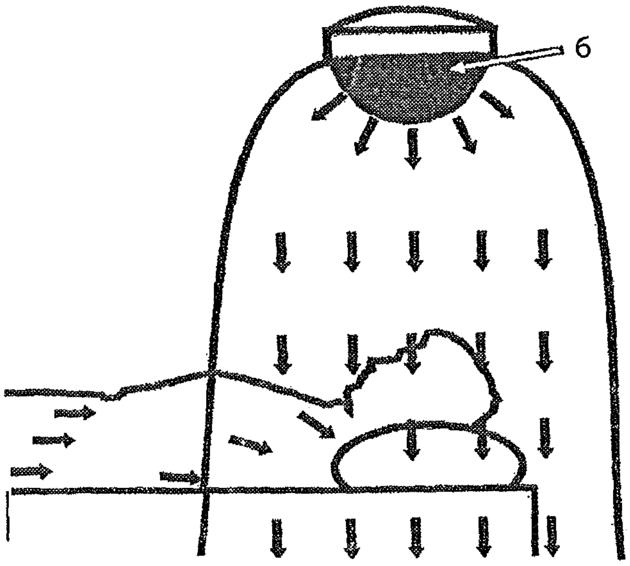
FIG. 2 illustrates a controlled personal breathing zone generated by TLA.

In other embodiments, the invention provides devices for displacing body convection and providing a controlled personal breathing zone. Preferred embodiments of a device according to the invention are typically adapted for nocturnal use. A user experiences a controlled breathing zone during sleeping hours that is associated with minimal operating noise generated by the device. As shown in FIG. 1, the warm body of a user in a sleeping position generates convection air currents. To be effective in providing a controlled personal breathing zone, TLA devices of the invention preferably provide a descending stream of filtered air that has sufficient velocity to overcome these convection body currents, as shown in FIG. 2.

In preferred embodiments, a device according to the invention utilizes TLA to generate a descending and substantially laminar flow of filtered air. This provides a controlled personal breathing zone that is substantially free of in-mixed, contaminated ambient air, able to displace body convection. A suitable device comprises at least one of each of the following: (1) an air inlet, (2) a filter, (3) a blower, (4) an air-temperature adjustment system, (5) an air-temperature control system, (6) an air supply nozzle, and (7) a housing.

The one or more air inlets (1) are preferably placed near the floor level of the premises in which the device is utilized, where the layer of coolest air is situated. Alternatively air inlets may be placed higher up in the room, although this typically results in higher energy consumption in that warmer layers of air must be cooled. Preferably, the air inlets are configured in such manner as to keep emission of sound waves during operation to the lowest practicable levels. The more that openings exist in the device housing, the greater will be the noise levels perceived by the user. In some embodiments, the air inlets may be associated with a pre-filter that also serves as a sound damper. In other embodiments, a HEPA filter that provides ultimate filtration of the supply air may be situated directly at the air inlets.

The filter (2) is preferably a high efficiency particulate air filter, preferably HEPA class H11, or higher if needed at point of care. In other embodiments, any suitable filter media or device adapted to filter particles or gases unwanted at the point of care may be used. Including for example any combinations of fiberglass and/or polymer fiber filters, or electro static filters, or hybrid filters (i.e. charging incoming particles and/or the filter media), or radiation methods (i.e. UV-light), or chemical and/or fluid methods, or activated carbon filters or other filter types.

While filter effectiveness is preferably high and stable over time, the resistance to air flow, or "pressure drop" generated by the filter is preferably kept low. Increased pressure drop generated by the filter, the device housing, the air delivery nozzle and other components and air channels of the device calls for increased blower speed which in turn generates unwanted noise. In preferred embodiments, pressure drop of a suitable filter is generally lower than 50 Pa. When using the preferred embodiment of HEPA filter using fiberglass or polymer fiber filter media, pressure drop is generally minimized by maximizing the active filter media area.

In preferred embodiments, HEPA filters are comprised of randomly arranged fibers, preferably fiberglass, having diameters between about 0.5 and 2.0 micron, and typically arranged as a continuous sheet of filtration material wrapped around separator materials so as to form a multi-layered filter. Mechanisms of filtration may include at least interception, where particles following a line of flow in the air stream come within one radius of a fiber and adhere to it; impaction, where large particles are forced by air stream contours to embed within fibers; diffusion, where gas molecules are impeded in their path through the filter and thereby increase the probability of particle capture by fibers. In some embodiments, the filter itself may comprise the air supply nozzle through which supply air is delivered.

Alternatively or complementary to a HEPA filter, any suitable air treatment system can be used, including at least a humidifier or a dehumidifier, ionizer, UV-light, or other system that provides air treatment beneficial at the point of care.

Preferred embodiments of a device according to the invention comprise an electronic filter identification system. When a filter becomes clogged with particles, its effective area is decreased and its pressure drop accordingly increased. This results in lower airflow, which reduces overall effectiveness of the device. Accordingly it is preferable that users change the filter within the recommended service interval. To facilitate proper use, preferred embodiments provide a filter management system that indicates when a filter should be changed. Each filter can be equipped with a unique ID that permits the TLA device to distinguish previously used filters from unused ones. Filter identification systems can be provided RFID, bar codes, direct interconnections, attachements such as iBUTTON™ circuits on a circuit board on the filter. It might also be possible to read or read and store other data than the serial number on the filter by this system. Information about the most appropriate airflow according to the filter type can for instance be supplied with the filter and be read automatically by the system.

The blower (3) generates air flow needed to feed a sufficiently large stream of air and to create pressure sufficient to overcome the pressure drop generated by the device. The blower may be of any suitable design, preferably comprising a fan impeller/blower rotor driven by an electric motor. Preferred embodiments are adapated so as to generate minimal noise during operations.

Blower noise is generally minimized by maximizing the size of the rotating rotor and minimizing the rotation per minute.

In preferred embodiments the fan generates a flow of filtered air through the device is less than 500 $m^3/h$, such as less than 400 $m^3/h$, preferably less than 300 $m^3/h$, such as less than 250 $m^3/h$, more preferably less than 225 $m^3/h$, such as less than 200 $m^3/h$, and even more preferably less than 175 $m^3/h$, such as less than 150 $m^3/h$.

The temperature adjustment system (4) cools and/or warms the supply air. In preferred embodiments, both heating and cooling are provided by a thermoelectric Peltier module. As is known in the art, a Peltier module can provide both heating and cooling depending on the polarity of the applied voltage or the direction of its operating current. In some embodiments, heating can be provided by an electric radiator, an electric convector or other type of heating methods, while cooling is provided by compressor (i.e. by using the Carnot process), or by fresh water cooling or other cooling means.

The temperature adjustment system preferably generates as little pressure drop as possible, preferably it has sufficiently large emission surfaces so as to avoid unwanted condense water when cooling in warm and humid conditions, and is preferably able to maintain a cooling power that is stable over time and with minimal short term variations of supply air-temperature.

In preferred embodiments, heating/cooling is evenly distributed by means of heat pipes. Fins mounted on the heat pipes, with short distance to heat/cool source, can cover a wide cross section area of the air flow. Because the distance to the heat/cool source is short, efficient heat exchange can be achieved using relatively thin fins. In contrast, relatively thicker fins with lower thermal resistance are required using extruded heat sinks because of the longer distance to the heat source. Accordingly, the heat pipe system can effectively provide heat/cool transfer to a cross section area of air flow with comparably thinner fins resulting in lower air resistance and minimized pressure drop. Further, the short distance to the heat/cool source using heat pipes leads to an evenly distributed surface temperature which makes more efficient heat transfer per unit fin area. This leads to smaller temperature differences and thereby less risk of condense water accumulating on cooler areas of the fins.

It will be readily understood by one skilled in the art that a variety of different schemes for temperature adjustment may be employed. In systems that utilize a TEC, excess heat can be dissipated in variety of ways, including passive or active convection or active liquid cooling.

Preferred embodiments can stably maintain an air-temperature difference of supply air relative to ambient air at the level of the point of care with a minimal fluctuation. Fluctuation of the air-temperature difference is preferably kept within the range of the margin of measurement error, preferably ±0.1° C. This stable air-temperature difference is preferably maintained at some point within the range of about 0.3 to 1° C. In this manner, descending air stream velocity can be "delicately balanced" between excessive velocity, which creates unwanted drafts, and sufficient velocity, which is just enough to break body convection currents.

The temperature control system (5) maintains a stable air-temperature difference between the descending supply air stream enveloping the point of care (i.e. the breathing zone of a sleeping person) and the ambient air as measured at the level of the point of care. In one preferred embodiment, the temperature control system comprises two sensors and a control unit. One temperature sensor is placed in the supply air channel just after the temperature adjustment device (4). A second sensor is placed in such manner as to measure ambient air at the level of the personal breathing zone but outside the effective stream of supply air. The control unit is preferably programmed to collect data from the two sensors and to regulate voltage applied to the Peltier element so as to maintain a temperature difference within the optimal range. Sensors are preferably protected from any kind of radiation from surfaces so as to provide an accurate air-temperature measurement. Preferably, sensors have high sensitivity and minimal error margin, ±0.05° C.

The air supply nozzle (6) delivers a substantially laminar stream of supply air with minimal in-mixing of ambient air. In order that velocity of the supply air stream may be determined by difference in air-temperature from ambient air at the level of the point of care, supply air preferably exits the nozzle with velocity (i.e., dynamic pressure) that is just sufficient to overcome nozzle resistance. This initial dynamic pressure of supply air is rapidly diminished by static pressure of ambient air until a point is reached at which gravity alone (i.e. air-temperature difference) determines the rate of further descent. The nozzle preferably has minimal impulse meaning that supply air may exit the nozzle with minimal dynamic pressure and, accordingly, whereby the point at which air-temperature difference alone determines the rate of further descent is reached well before the supply air stream reaches the point of care. In some embodiments, the nozzle (6) can be replaced by or made in combination with one or more filters (2) as an integral part of the air supply nozzle or as the sole part delivering supply air.

A wide variety of nozzle shapes and sizes can be used. However, the rate at which initial velocity of supply air is diminished by static pressure of ambient air is affected by nozzle shape. Pitch length refers to the distance from the surface of the nozzle at which the cumulative effect of static pressure of ambient air counterbalances the dynamic pressure of supply air that has been set into flow with impulse just sufficient to overcome resistance in the nozzle. This is shown at the double headed arrow in FIG. 6. Preferably, a suitable nozzle has minimal pitch length. This permits gravity (i.e., air temperature difference) to control the downward air flow velocity at a point well above the point of care. Short nozzle pitch length also ensures that supply air flow will introduce minimal disturbance of ambient air which in turn minimizes turbulences that arise when supply air meets still, standing ambient air. In preferred embodiments, nozzle pitch length ends well before the point of care.

Preferably the pitch length, as defined by an air velocity of <0.2 m/s, should reach less than 20 cm from the air delivery device. In any case, the pitch length is preferably no longer than the distance between the air supply nozzle and the point of care. The prime factors determining the actual pitch length are shape of the nozzle and the composition the materials shaping the nozzle. A preferred nozzle is described in WO2005/017419, which is hereby incorporated by reference in entirety. An air delivery nozzle with a substantially spherical shape as described is likely to cater for a larger effective operative area as compared to a flat air delivery nozzle, given identical air flow. However, both flat or spherical shaped nozzles can be used.

The substantially spherical shape has the advantage of being compact. Further the shape forces the air flow to be distributed over an increasing surface area. This reduces pitch length, in that the decrease in air velocity is dependent on friction between the supply air and ambient air. The spherical surface distributes supply air flow to a surface are that increases with approximately the square of the distance from the nozzle centre. The increasing surface area forces the velocity to decrease with approximately 1/(the square of the distance from the nozzle centre) giving the spherical nozzle a natural character with a short pitch length. In contrast, a flat delivery nozzle generates an air flow with a constant distribution area and a correspondingly longer pitch length.

Any alternative nozzle with similar characteristics of minimal pitch length and low disturbance of ambient air may be used.

In a preferred embodiment the air treatment device of the invention is mobile for being movable within a premises.

Figure 3:
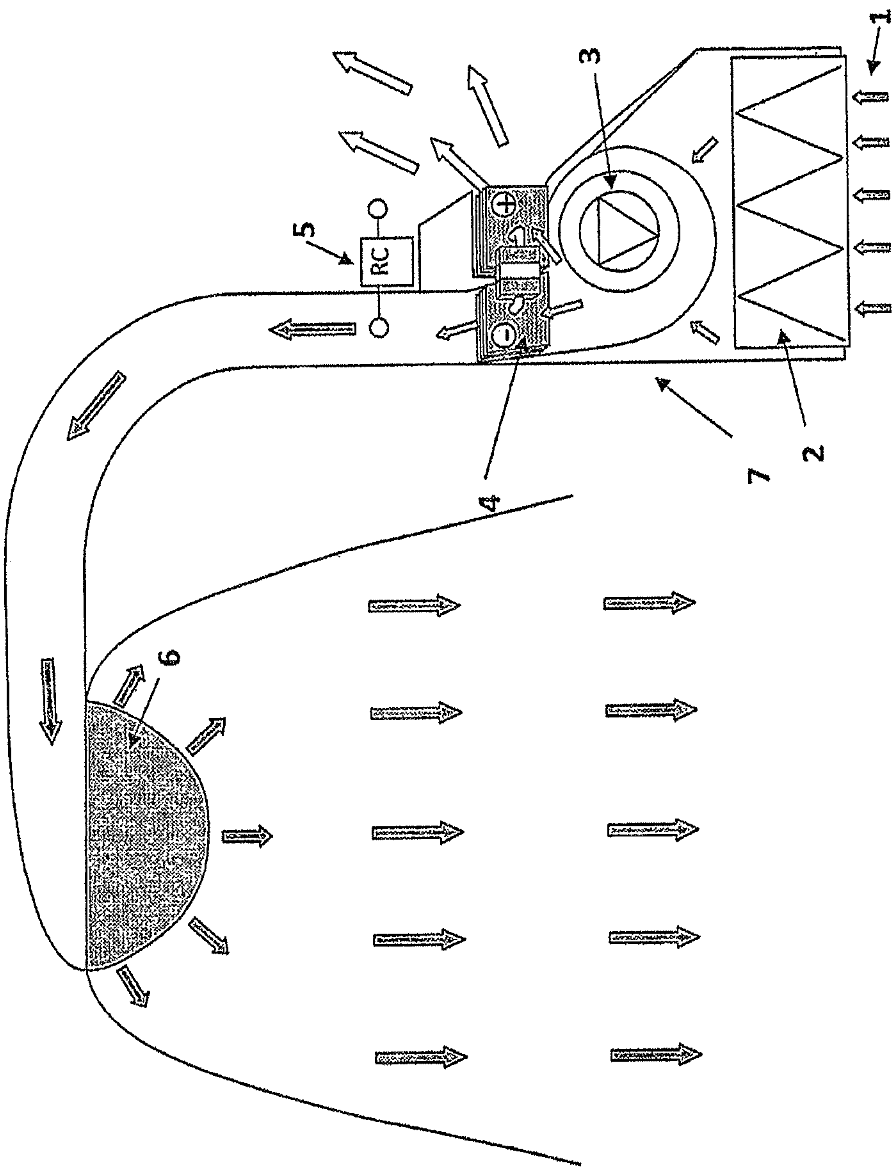
FIG. 3 illustrates an embodiment of a device according to the invention.

FIG. 3 illustrates a preferred embodiment of a device according to the invention. Ambient air (symbolized by shaded arrows, indicating flowing air) is taken in through the air inlet (1), which is situated at floor level at the bottom of the housing (7). Intake air is filtered by the filter (2), driven by action of the blower (3). An air-temperature adjustment device (4) is situated so as to provide both cooling and heating of the filtered supply air stream. The device comprises a Peltier element with reversible voltage polarity connected via heat pipes to two sets of fins. One set of fins serves primarily to distribute cooling effect in the supply air stream while the other set of fins serves primarily to provide dissipation of excess heat generated by the Peltier module. Parts of or the whole air-temperature adjustment device (4) may be situated before the filter (2) and/or the blower (3). Parts of or the whole air-temperature adjustment device (4) may also be situated in other parts of the device such as the nozzle (6). The temperature control device (5) comprises a control unit (square) and two sensors (circles). One sensor is placed in the supply air stream while the other is placed in such manner so as to measure ambient air temperature at the level of the personal breathing zone but outside the supply air stream. The control unit, informed by air temperature measurements from the sensors, regulates the temperature adjustment unit so as to maintain a stable air-temperature difference between the supply air and ambient air at the level of the point of care. Supply air is driven by action of the blower (3) out of the nozzle (6) with minimal impulse.

Figure 4A:
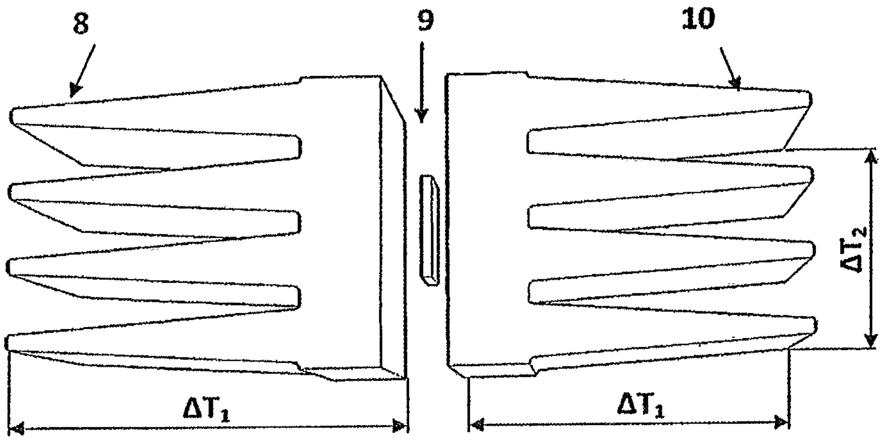
FIGS. 4A and 4B each illustrate an embodiment of a filtered air-stream temperature adjustment unit.
Figure 4B:
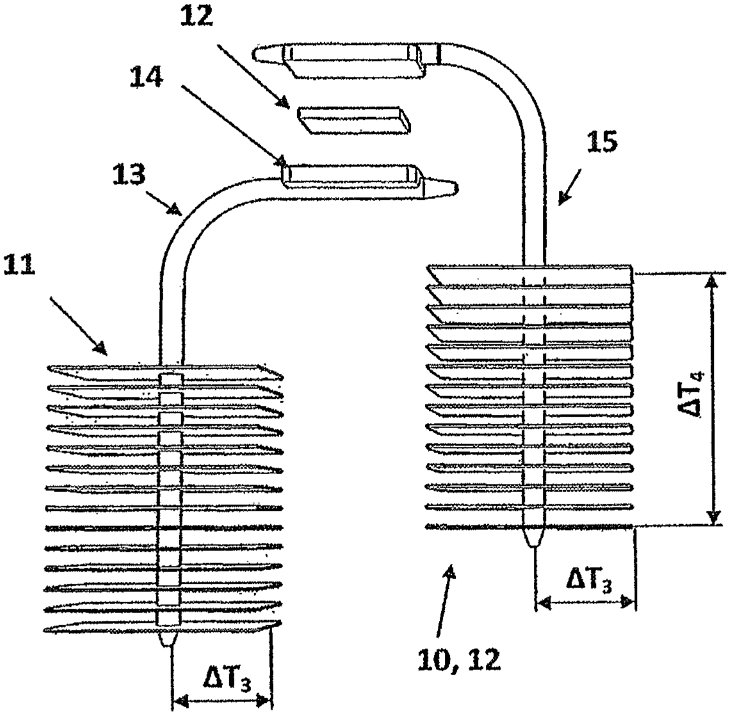

FIGS. 4A and 4B show, in greater detail, an air-temperature adjustment unit (4) of a preferred embodiment. FIG. 4A shows a TEC system with extruded heat sinks. In this system the TEC (9) distributes generated cooling effect on one side by interfacing an extruded heat sink (8). On the other side of the TEC heat is dissipated to a similar extruded heat sink (10). FIG. 4B shows a heat pipe system. Here the TEC (12) interfaces a connection block (14) with at least the same area as the TEC. From here the cooling effect is transported to the fins by a heat pipe (13). At the warm side (15) the heat is transferred in the same way. The Peltiere element is normally fitted with thermal grease or a thermal pad which increases the thermal conductivity of the thermal interface by compensating for the irregular surfaces of the components.

Figure 5A:
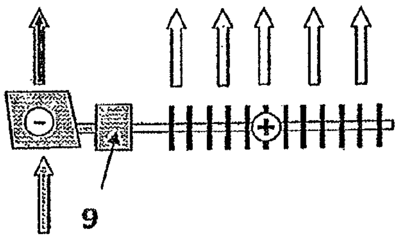
FIGS. 5A to 5D illustrate alternative systems for dissipation of excess heat from the air-stream temperature adjustment unit by, respectively, convection, radiation, active convection and active liquid cooling.
Figure 5B:
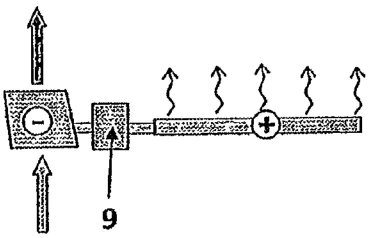
Figure 5C:
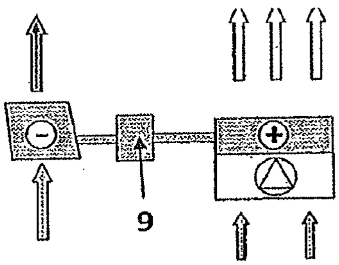
Figure 5D:
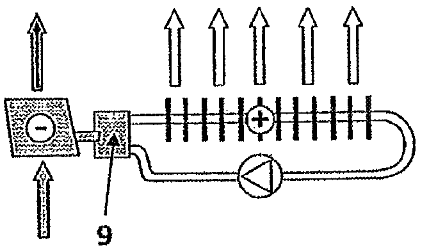

FIGS. 5A to 5D show alternative systems for dissipating excess heat generated by the air-temperature adjustment unit. In a preferred embodiment using a TEC system, excess heat can be dissipated by convection, as shown in FIG. 5A, by radiation, as shown in FIG. 5B, by active convection, as shown in FIG. 5C, or by active liquid cooling, as shown in FIG. 5D. These alternative systems may act alone or in combination (i.e. by combining convection with radiation).

Figure 6:
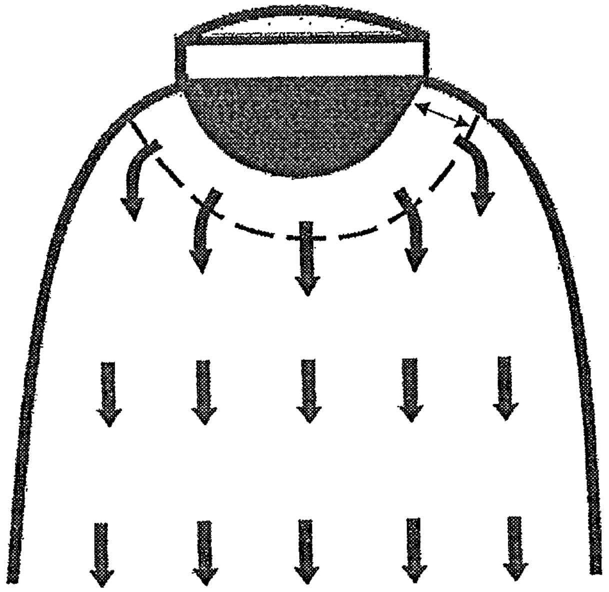
FIG. 6 illustrates functioning of one embodiment of a nozzle.

FIG. 6 illustrates functioning of the nozzle (6) of the preferred embodiment shown in FIG. 3. Shown is a schematic illustration of the functioning of the nozzle described in WO2005/017419.

Supply air is initially forced out of the nozzle with a slight velocity, about 0.2 m/s, just sufficient to overcome resistance in the nozzle. The spherical surface distributes supply air flow to a surface area that increases with approximately the square of the distance from the nozzle centre. Friction with ambient air dissipates the air flow velocity up to the pitch length, after which further descent of the supply air stream is determined by air-temperature difference (gravity).

Figure 7A:
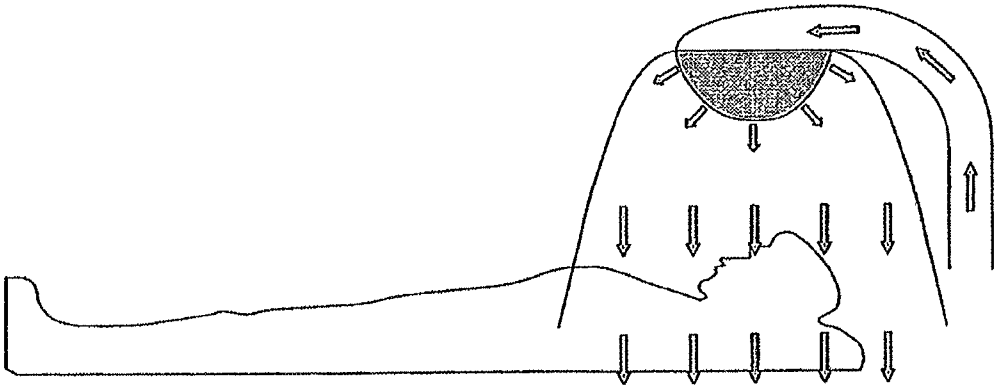
FIGS. 7A to 7D illustrate four alternative arrangements of preferred embodiments used in providing a controlled personal breathing zone.
Figure 7B:
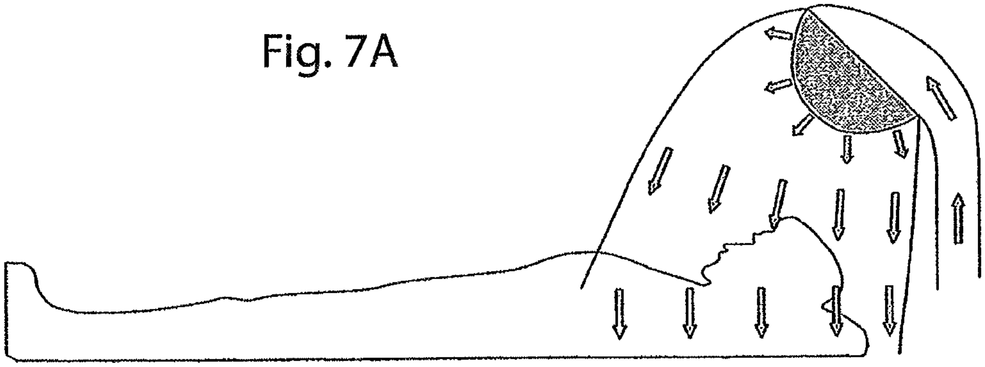
Figure 7C:
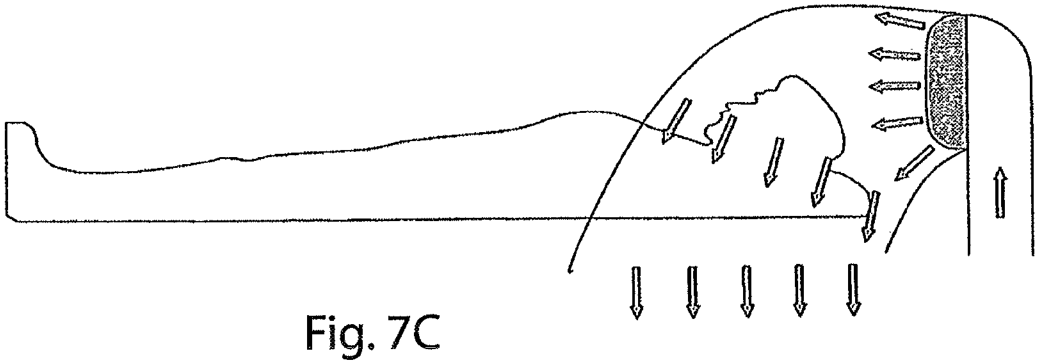
Figure 7D:
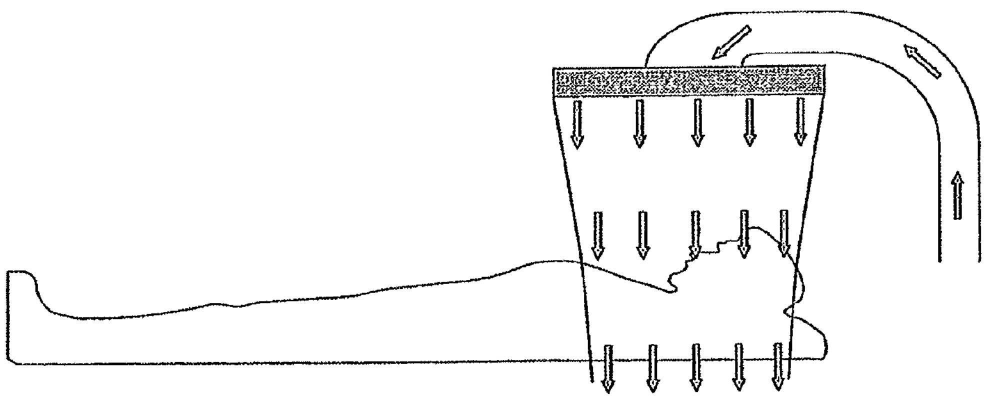

FIGS. 7A to 7D illustrate four alternative arrangements of preferred embodiments used in providing a controlled personal breathing zone. The air delivery nozzle, which can be spherical or flat or other shape, can be placed straight above the point of care, as shown in FIGS. 7A and 7D. It can be slightly tilted and placed slightly off center of the point of care, as shown in FIG. 7B. It can be placed aside the point of care directing an impulse horizontally towards the point of care, as shown in FIG. 6*c*. In all settings gravity (temperature difference) defines a substantially downward directed air stream (after initial forced impulse has been counteracted by friction with ambient air). The downward directed supply air stream has sufficient velocity to displace conflicting body convection as illustrated in FIG. 1. The preferred distance between the nozzle and the point of care is preferably within the range of about 20 cm to 80 cm.

The preferred embodiments described are exemplary only and not intended to limit the scope of the invention as defined by the claims.

The invention claimed is:

1. A method for displacing body convection and providing a controlled personal breathing zone comprising taking air from a premises into an air treatment device adjusting the air temperature by either heating or cooling of a supply air stream depending on ambient air temperature and purifying a flow of air in said device by adjusting the temperature either before or after filtration using one or more HEPA filters discharging the purified air stream through an air supply device, situated above or adjacent to the personal breathing zone, as a substantially laminar descending air flow with a velocity determined by the difference in air temperature between the supplied air and the ambient air at the level of the personal breathing zone said velocity being higher than 0.1 m/s without the requirement for a secondary heated air stream wherein said difference in air temperature is maintained within a range of 0.3 to 1 ° C. cooler than the ambient air at the level of the personal breathing zone.

2. The method of claim 1 wherein the air supply device is situated at a level of about 0.2 to 0.8 m above the personal breathing zone.

3. The method of claim 1 wherein the flow of filtered air through the device is less than 500 $m^3$/h.

4. An air treatment device for displacing body convection and providing a controlled personal breathing zone comprising one or more air inlets one or more filters a blower an air temperature adjustment system adapted to provide either heating or cooling of a supply air stream depending on ambient air temperature an air supply nozzle adapted to discharge a substantially laminar air flow, and a housing wherein the device is adapted to provide a substantially laminar descending purified air flow having a velocity determined by a difference in air temperature between the supplied air and ambient air as measured at the level of the personal breathing zone said velocity being higher than 0.1 m/s and wherein said difference in air temperature is maintained within a range of 0.3 to 1 ° C. cooler than the ambient air at the level of the personal breathing zone and there is no requirement for a secondary heated air stream.

5. The air treatment device of claim 4 wherein the air temperature adjustment system comprises a thermoelectric cooler using a Peltier, module with reversible voltage polarity.

6. The air treatment device of claim 4 wherein the air temperature adjustment system comprises a thermoelectric cooler using a Peltier element with reversible voltage polarity in communication with heat pipes mounted with fins that distribute heating/cooling effect.

7. The air treatment device of claim 4 wherein dissipation of excess heat generated by the temperature adjustment system is provided by transfer to the housing of the air treatment device and dissipation by passive convection and/or radiation.

8. The air treatment device of claim 4 further characterized by having an air temperature adjustment unit comprising a system for dissipation of excess heat selected from the group consisting of convection, radiation, active convection, and active liquid cooling.

9. The air treatment device of claim 4 further characterized by having an electronic filter identification system.

10. The air treatment device of claim 4 wherein the position of the air supply device is at a level of about 0.2 to 0.8 m above the breathing zone in either an adjustable or fixed position.

11. The air treatment device of claim 4 further characterized by having means for addition of moisture and/or medicine to the purified air stream.

12. The air treatment device of claim 4 wherein the air supply nozzle and the one or more filters are provided by one physical unit.

13. The air treatment device of claim 4 wherein communication between the air temperature adjustment system and the one or more filters is such that supply air is cooled or heated after filtration.

* * * * *